(12) United States Patent
Chang

(10) Patent No.: US 8,016,472 B2
(45) Date of Patent: Sep. 13, 2011

(54) OPTICAL PLATE AND BACKLIGHT MODULE USING THE SAME

(75) Inventor: Shao-Han Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 329 days.

(21) Appl. No.: 12/317,993

(22) Filed: Dec. 31, 2008

(65) Prior Publication Data

US 2010/0008061 A1   Jan. 14, 2010

(30) Foreign Application Priority Data

Jul. 8, 2008  (CN) .......................... 2008 1 0302648
Jul. 8, 2008  (CN) .......................... 2008 1 0302649

(51) Int. Cl.
   *F21V 7/04*   (2006.01)
   *F21V 7/06*   (2006.01)
   *F21V 7/09*   (2006.01)
   *G02B 6/10*   (2006.01)

(52) U.S. Cl. ........ 362/615; 362/616; 362/620; 362/625; 362/606; 385/129; 385/131

(58) Field of Classification Search .......... 362/615–617, 362/619–622, 625, 626, 628, 606; 385/129–131; 65/385, 386; 349/67, 159, 62; 359/49
See application file for complete search history.

(56) References Cited

U.S. PATENT DOCUMENTS

| | | | |
|---|---|---|---|
| 7,220,026 B2 * | 5/2007 | Ko et al. | 362/339 |
| 7,252,428 B2 * | 8/2007 | Lee et al. | 362/628 |
| 7,637,640 B2 * | 12/2009 | Chang | 362/330 |
| 7,695,152 B2 * | 4/2010 | Chang | 362/97.2 |
| 2004/0130911 A1 * | 7/2004 | Chen | 362/558 |
| 2006/0245212 A1 * | 11/2006 | Wei et al. | 362/615 |
| 2006/0256582 A1 * | 11/2006 | Chuang | 362/620 |
| 2007/0147023 A1 * | 6/2007 | Matsushita | 362/97 |
| 2008/0137201 A1 * | 6/2008 | Hsu et al. | 359/599 |

* cited by examiner

*Primary Examiner* — Anabel Ton
*Assistant Examiner* — Danielle Allen
(74) *Attorney, Agent, or Firm* — Altis Law Group, Inc.

(57) ABSTRACT

An optical plate has a first surface and a second surface opposite to the first surface. The first surface defines a plurality of elongated arcuate troughs therein. The second surface defines a plurality of triangular pyramid depressions and a plurality of hexagonal pyramid depressions therein. Each side of the triangular pyramid depressions borders three hexagonal pyramid depressions. A backlight module using the optical plate is also provided.

20 Claims, 11 Drawing Sheets

OPTICAL PLATE AND BACKLIGHT MODULE USING THE SAME

BACKGROUND

1. Technical Field

The present disclosure generally relates to optical plates and, more particularly, to an optical plate employed in a backlight module.

2. Discussion of the Related Art

Referring to FIGS. 10 and 11, a typical direct type backlight module 100 includes a housing 11, a plurality of light sources 12, a light diffusion plate 13, and a prism sheet 10. The light sources 12 are positioned in an inner side of the housing 11. The light diffusion plate 13 and the prism sheet 10 are positioned on the light sources 12 above a top of the housing 11. The light diffusion plate 13 includes a plurality of diffusing particles (not shown) to diffuse light. The prism sheet 10 includes a transparent substrate 101 and a prism layer 103 formed on a surface of the transparent substrate 101. A plurality of elongated V-shaped ridges 105 are formed on the prism layer 103.

Light emitted from the light sources 12 enters the diffusion plate 13 and becomes scattered. The scattered light leaves the diffusion plate 13, travels through the prism sheet 10, and is refracted out at the elongated V-shaped ridges 105.

The refracted light leaving the prism sheet 10 is concentrated at the prism layer 103 and increases the brightness of the prism sheet 10. The refracted light propagates into a liquid crystal display panel (not shown) positioned above the prism sheet 10.

However, although the light from the light sources 12 enters the diffusion plate 13 and becomes scattered, many strong light spots are still formed.

To reduce or eliminate the strong light spots, the backlight module 100 may include an upper light diffusion film 14 positioned on the prism sheet 10.

However, a plurality of air pockets exist around the boundaries of the light diffusion film 14 and the prism sheet 10. When the light passes through the air pockets, some of the light undergoes total reflection along one or more boundaries. In addition, the upper light diffusion film 14 may absorb some of the light from the prism sheet 10. As a result, light illumination brightness of the backlight module 100 is reduced.

Therefore, a new optical plate is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

Figure 1:
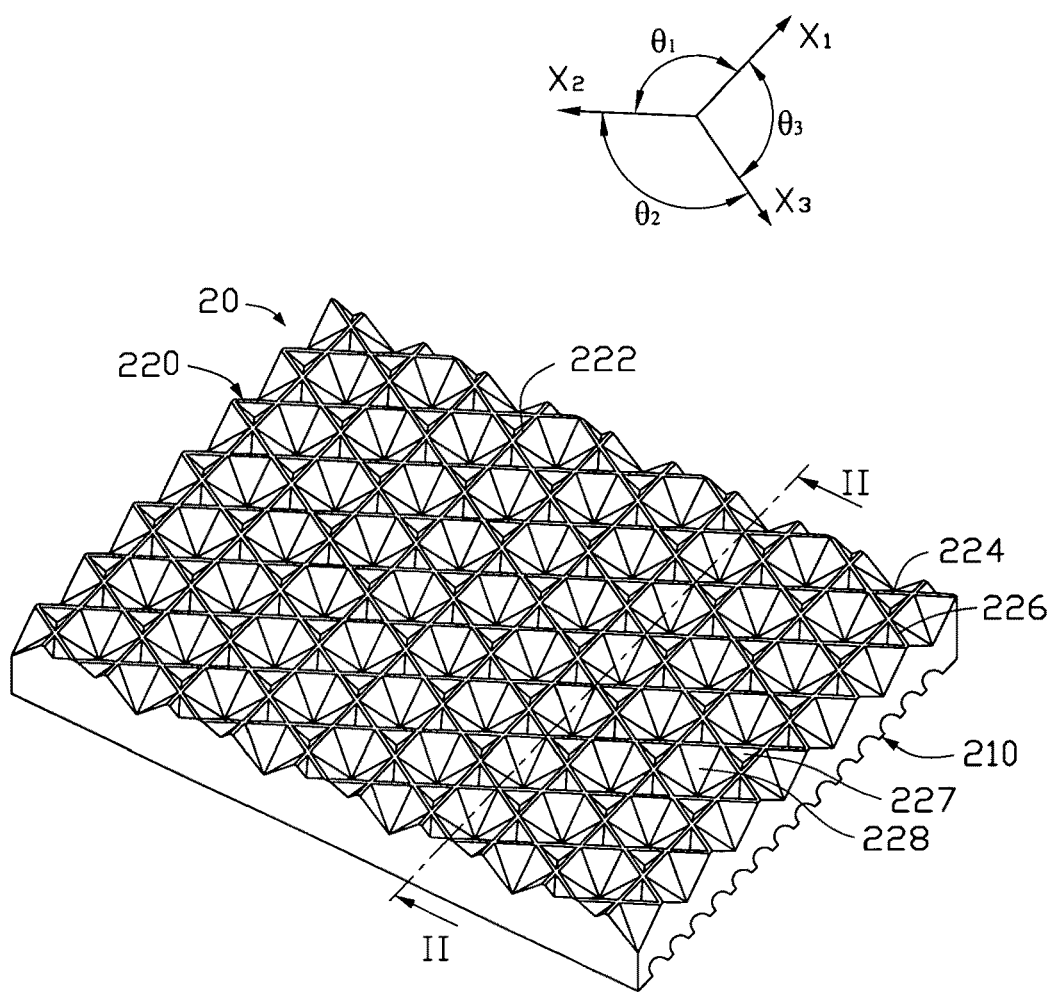
FIG. 1 is an isometric view of a first embodiment of an optical plate.
Figure 2:
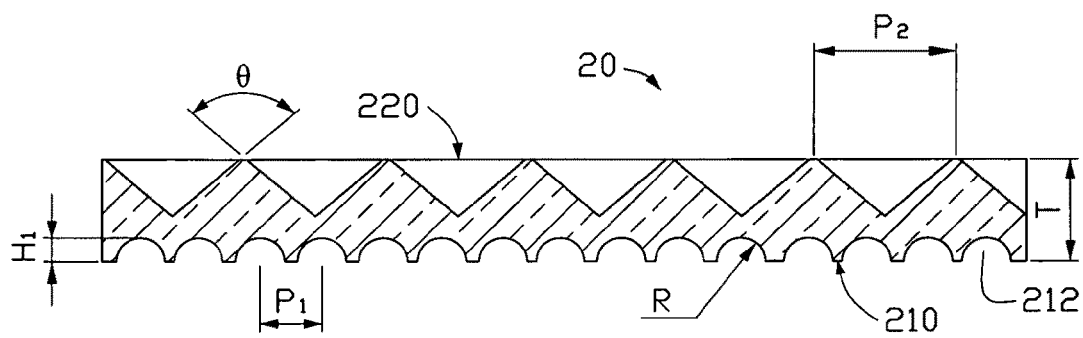
FIG. 2 is a cross-sectional view taken along the line II-II of FIG. 1.

Referring to FIG. 1, in a first embodiment, an optical plate 20 has a first surface 210 and a second surface 220 opposite to the first surface 210.

A plurality of elongated troughs 212 is formed on the first surface 210 for concentrating light. The elongated arcuate troughs are parallel to each other and extend along a same direction. A cross-section of the elongated arcuate troughs 212 may be semi-circular.

A pitch $P_1$ between adjacent elongated arcuate troughs 212 is about 0.025 millimeters (mm) to about 1.5 mm. A radius R of the elongated arcuate troughs 212 is about 0.006 mm to about 3 mm. The maximum depth $H_1$ is about 0.01 mm to about 3 mm.

The second surface 220 defines a plurality of triangular pyramid depressions 227 and a plurality of hexagonal pyramid depressions 228. A side of each triangular pyramid depressions 227 borders with adjacent hexagonal pyramid depressions 228.

In the illustrated embodiment, sidewalls sharing a same edge on each side of the triangular pyramid depressions 227 and the adjacent hexagonal pyramid depressions 228 collectively form a plurality of first trapeziform ridges 222, a plurality of second trapeziform ridge 224, and a plurality of third trapeziform ridges 226. The first trapeziform ridges 222 extend along a first direction $X_1$. The second trapeziform ridges 224 extend along a second direction $X_2$. The third trapeziform ridges 226 extend along a third direction $X_3$.

One of the first, second, and third directions $X_1$, $X_2$, $X_3$ is substantially perpendicular to an extending direction of the elongated arcuate troughs 212 in the first surface 210. In the illustrated embodiment, the first direction $X_1$ is substantially perpendicular to the extending direction of the elongated arcuate troughs 212 in the first surface 210.

The first direction $X_1$ and the second direction $X_2$ cooperatively define an angle $\theta_1$, the second direction $X_2$ and the third direction $X_3$ cooperatively define an angle $\theta_2$, and the first direction $X_1$ and the third direction $X_3$ cooperatively define an angle $\theta_3$. The angles $\theta_1$, $\theta_2$, $\theta_3$, are about 120 degrees. A pitch $P_2$ of the adjacent trapeziform ridges aligned in the same direction is from about 0.025 mm to about 1 mm.

Alternatively, an angle defined by opposite sidewalls of each trapeziform ridge may be about 50 degrees to about 120 degrees. The angles $\theta_1$, $\theta_2$, $\theta_3$, may vary, thereby adjusting the brightness of light travelling through the optical plate 20.

In an alternative embodiment, the first, second, and third trapeziform ridges 222, 224, 226, may be V-shaped ridges having a vertex angle taken along a plane perpendicular to an extending direction of the corresponding V-shaped ridge of about 50 degrees to about 120 degrees.

A thickness T of the optical plate 20 is about 0.4 mm to about 4 mm. The optical plate 20 may be made of polycarbonate, polymethyl methacrylate, polystyrene, copolymer of methyl methacrylate and styrene, or any suitable combination of those.

Figure 3:
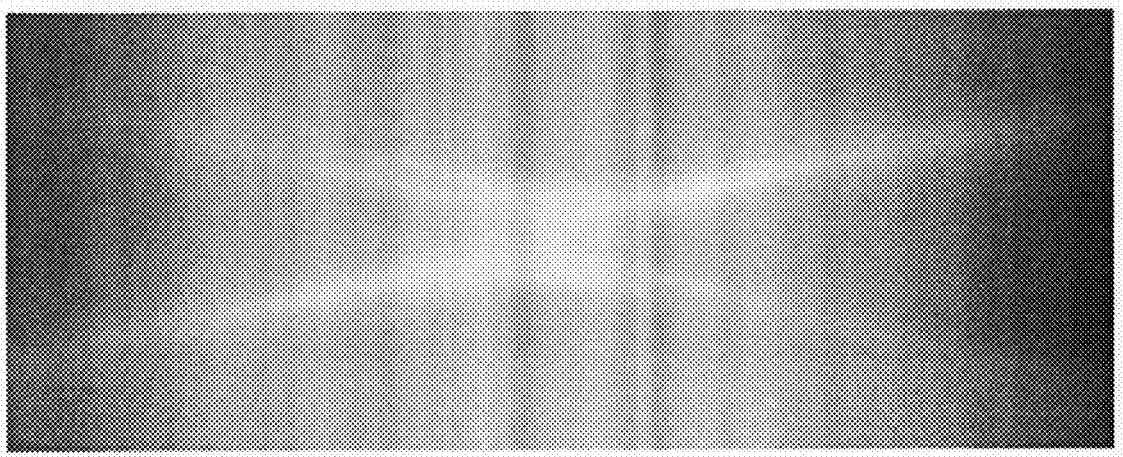
FIG. 3 is a photo showing an illumination distribution in a test of a backlight module using the optical plate of FIG. 1.

Referring to FIG. 3, when light emitted from a point light source travels through the optical plate 20, strong light spots of the light sources seldom occur, more uniform light is achieved, and an upper light diffusion film positioned above the optical plate 20 is unnecessary. Thus, the efficiency of light utilization is enhanced.

Figure 4:
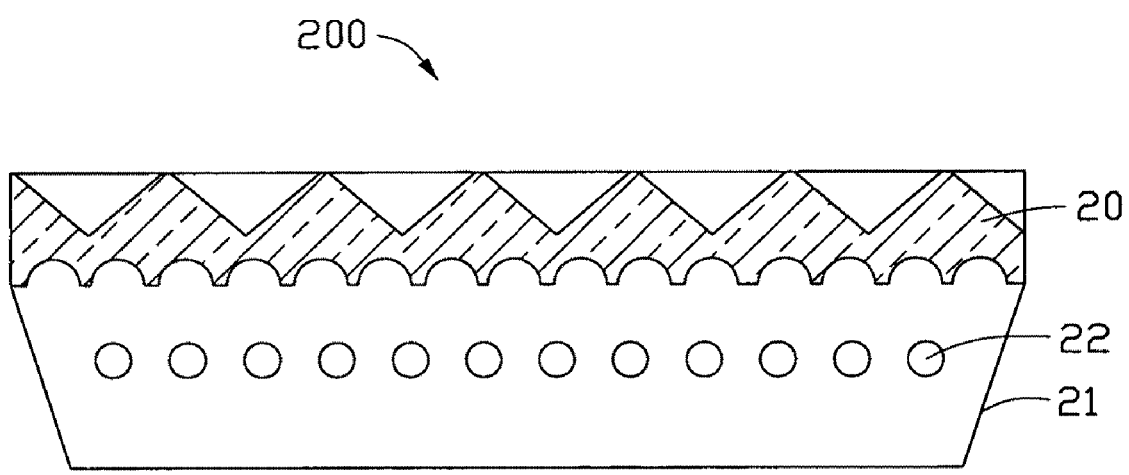
FIG. 4 is a cross-sectional view of a backlight module, showing the optical plate of FIG. 1 employed in the backlight module.

Referring to FIGS. 1 and 4, a backlight module 200 includes the optical plate 20, a housing 21, and a plurality of light sources 22. The light sources 22 are regularly arranged on a base of the housing 21. The optical plate 20 is positioned on the light sources 22 at a top of the housing 21. The first surface 210 of the optical plate 20 faces the light sources 22 and the second surface 220 of the optical plate 20 faces away from the light sources 22, so that light enters the optical plate 20 via the first surface 210.

The housing 21 may be made of metal or plastic materials having a highly reflective surface. Alternatively, an interior of the housing 21 may have a high reflectivity coating to improve light reflectivity The light sources 22 may be point light sources or linear light sources, such as light emitting diodes and cold cathode fluorescent lamps. In this embodiment, the light sources 22 are linear light sources substantially parallel to each other. An extending direction of the light sources 22 is substantially parallel to an extending direction of the elongated arcuate troughs 212.

In the backlight module 200, light enters the optical plate 20 via the first surface 210. Since the extending direction of the light sources 22 is substantially parallel to the extending direction of the elongated arcuate troughs 212 in the first surface 210, light from the light sources 22 is concentrated at the first surface 210. In addition, since the inner surfaces of the triangular pyramid depressions 227 and the inner surface of the hexagonal pyramid depressions 228 of the second surface 220 are slanted, incident light that may have been internally reflected on a flat surface, is refracted, reflected, and diffracted. As a result, light outputted from the second surface 220 is more uniform than light outputted from a light output surface of a typical prism sheet, and strong light spots seldom occur. In addition, an extra upper light diffusion film between the optical plate 20 and the liquid crystal display panel is unnecessary. Thus, the efficiency of light utilization is enhanced.

In addition, in contrast to the typical prism sheet 10, the optical plate 20 is integrally formed by injection molding technology, so the optical plate 20 has a better rigidity and mechanical strength than the typical prism sheet 10 because the optical plate 20 is integrally formed. Thus, the optical plate 20 has a relatively high reliability.

Figure 5:
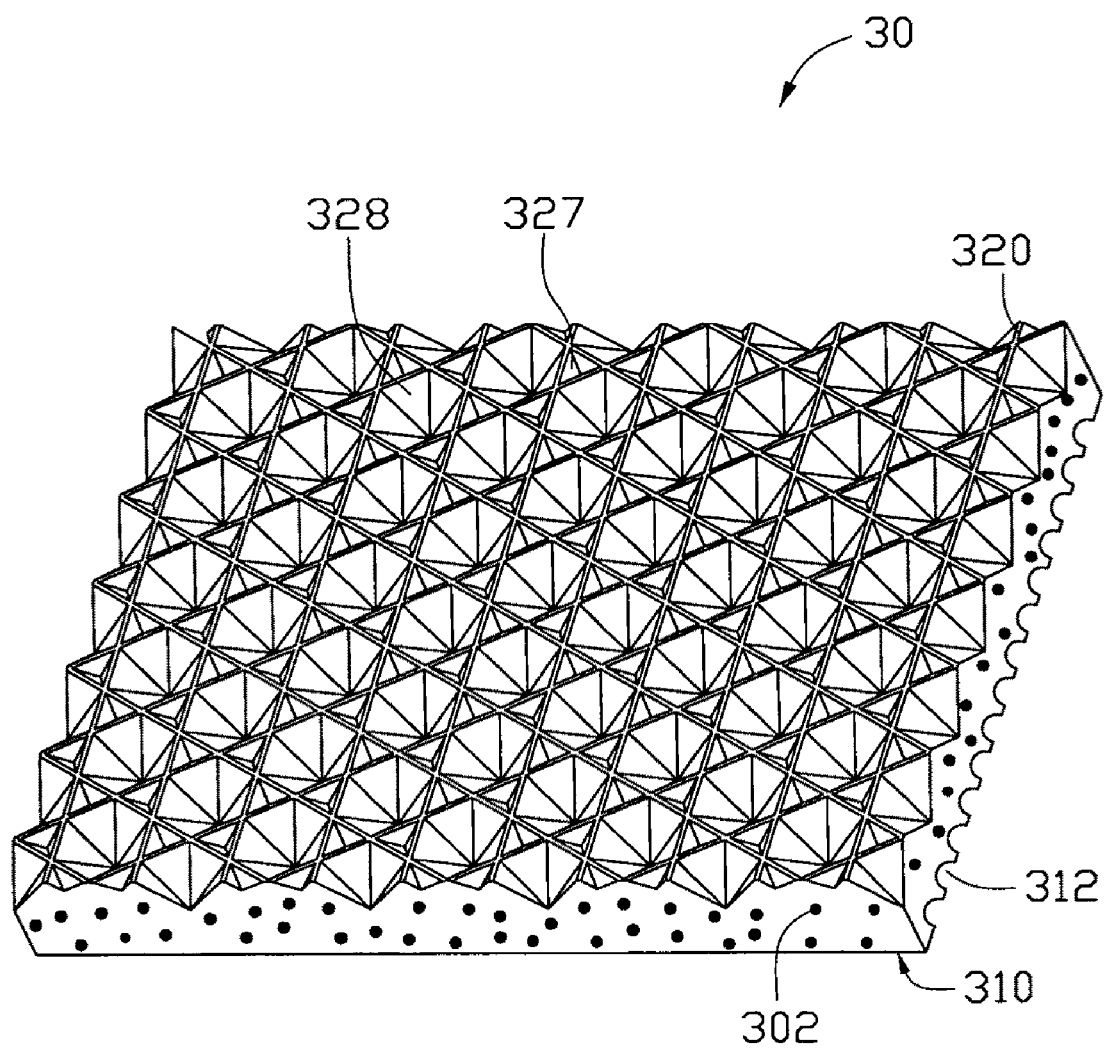
FIG. 5 is an isometric view of a second embodiment of an optical plate.

Referring to FIG. 5, a second embodiment of an optical plate 30 is similar in principle to the first embodiment of the optical plate 20, except that a plurality of diffusion particles 302 is dispersed in the optical plate 30. The optical plate 30 has a first surface 310 and a second surface 320 opposite to the first surface 310. A plurality of elongated arcuate troughs 312 for concentrating light is formed on the first surface 310. The second surface 320 defines a plurality of triangular pyramid depressions 327 and a plurality of hexagonal pyramid depressions 328. Each side of the triangular pyramid depressions 327 is bordered with three hexagonal pyramid depressions 328.

The optical plate 30 may be made of polyacrylic acid (PAA), polycarbonate (PC), polystyrene (PS), polymethyl methacrylate (PMMA), methylmethacrylate and styrene (MS), or any suitable combination thereof.

The diffusion particles 302 may be made of titanium dioxide, silicon dioxide, acrylic resin, or any combination thereof. The diffusion particles 302 scatter light and enhance the light distribution capability of the optical plate 30.

Figure 6:
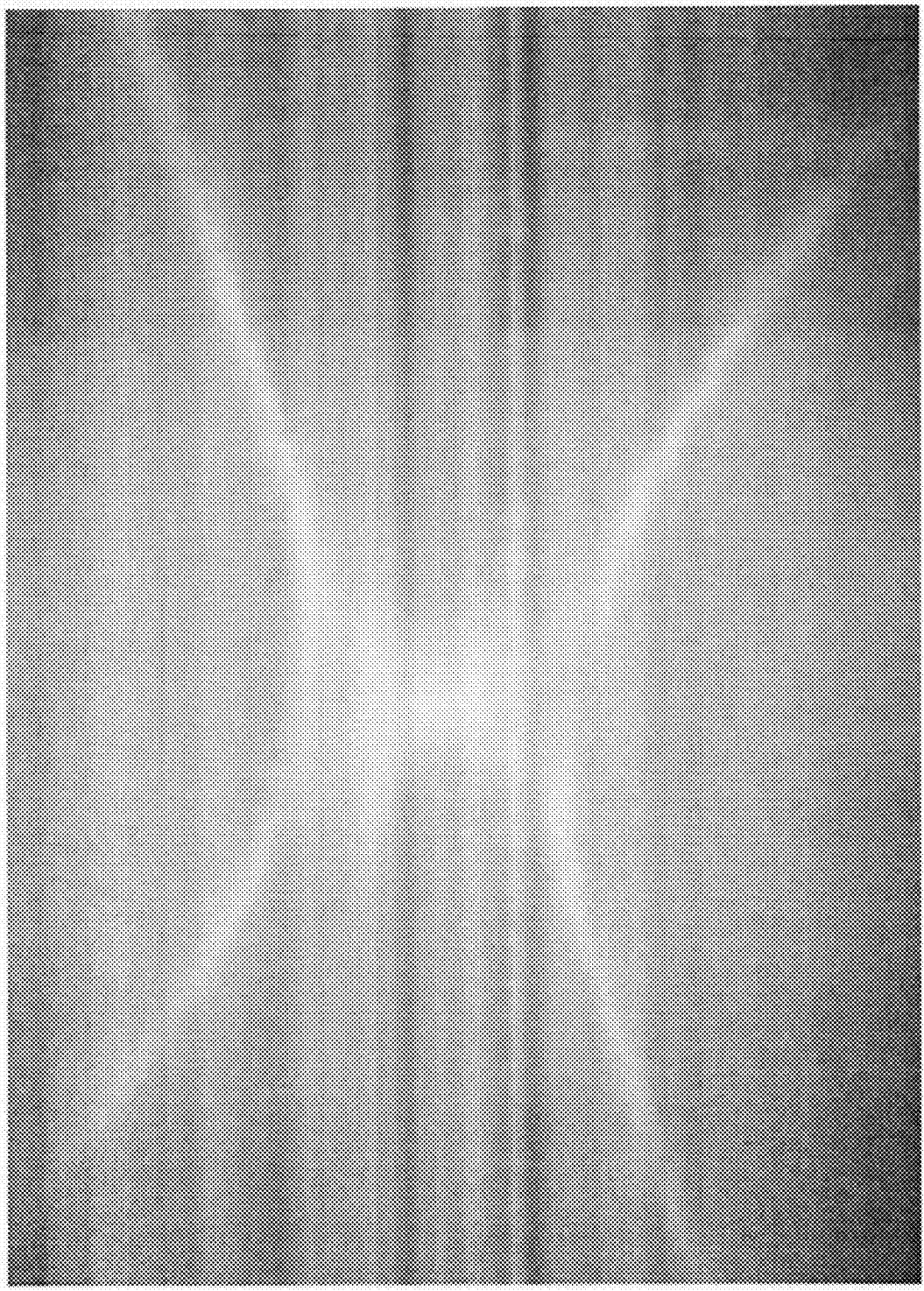
FIG. 6 is a photo showing an illumination distribution in a test of a backlight module using the optical plate of FIG. 5.

Referring to FIG. 6, when light emitted from a point light source travels through the optical plate 30, strong light spots of the light sources seldom occur, the diffusion particles 302 can scatter light and enhance the light distribution capability of the optical plate 30, more uniform light is achieved. Therefore, an upper light diffusion film positioned above the optical plate 30 is unnecessary. Thus, the efficiency of light utilization is enhanced.

Figure 7:
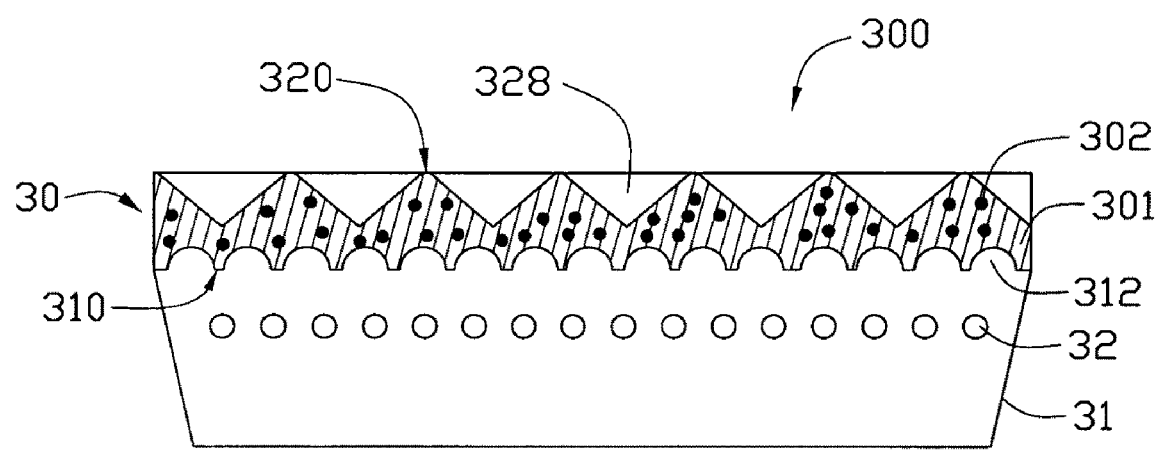
FIG. 7 is a cross-sectional view of a backlight module, showing the optical plate of FIG. 5 employed in the backlight module.

Referring to FIG. 7, the optical plate 30 is similar to the backlight module 200, except that the diffusion particles 302 are dispersed in the optical plate 30. Light enters the optical plate 30 via the first surface 310, and is concentrated by the elongated arcuate troughs 312 in the first surface 310. Subsequently, light is scattered by the diffusion particles 302 of the optical plate 30. As light travels through the triangular pyramid depressions 327 and the hexagonal pyramid depressions 328 of the second surface 320, the light is refracted, reflected, and diffracted, resulting in a more uniform light than light outputted from a typical prism sheet and less likelihood of strong light spots. In addition, an extra upper light diffusion film between the optical plate 30 and the liquid crystal display panel is unnecessary. Thus, the efficiency of light utilization is enhanced.

Figure 8:
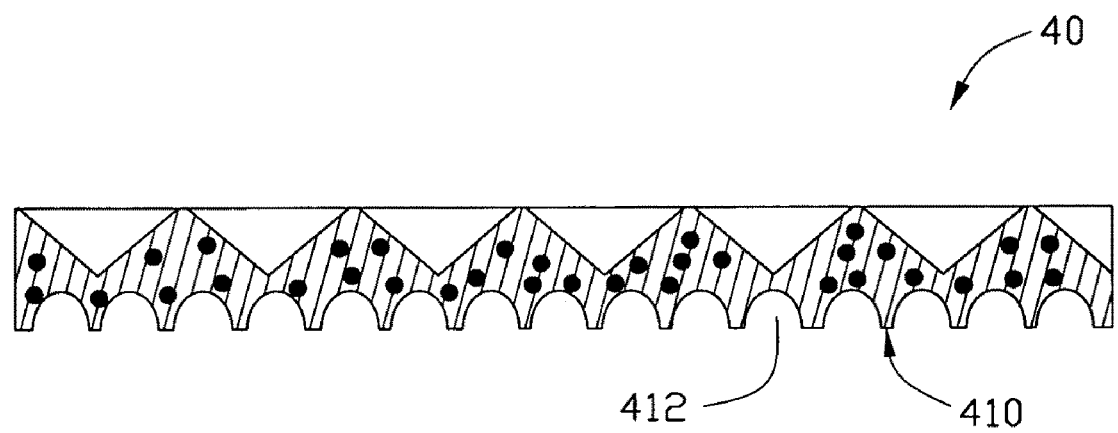
FIG. 8 is a cross-sectional view of a third embodiment of an optical plate.

Referring to FIG. 8, a third embodiment of an optical plate 40 is similar in principle to the second embodiment of the optical plate 30, except that a cross-section of elongated arcuate troughs 412 of a first surface 410 of the optical plate 40 may be a semi-elliptical curve.

Figure 9:
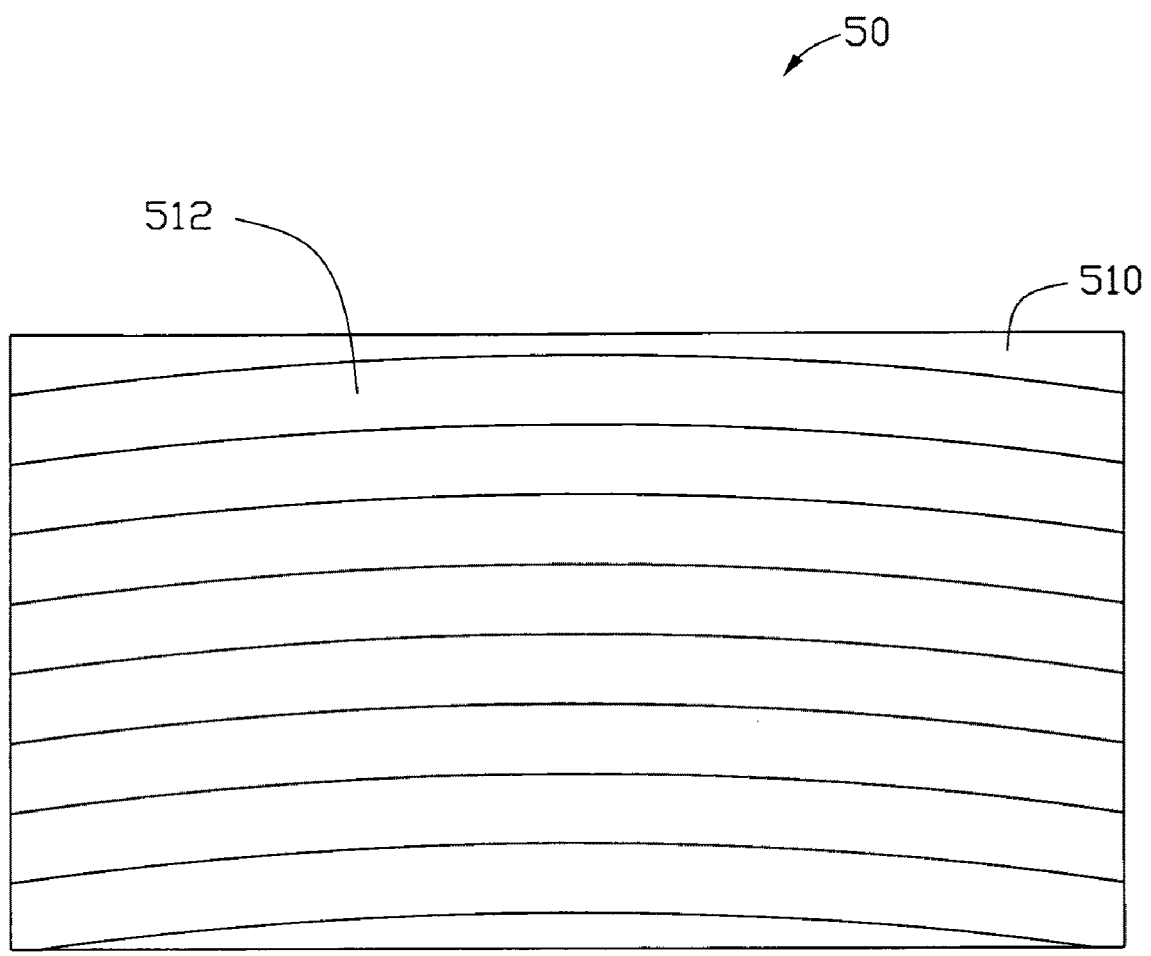
FIG. 9 is a top plan view of a fourth embodiment an optical plate.
Figure 10:
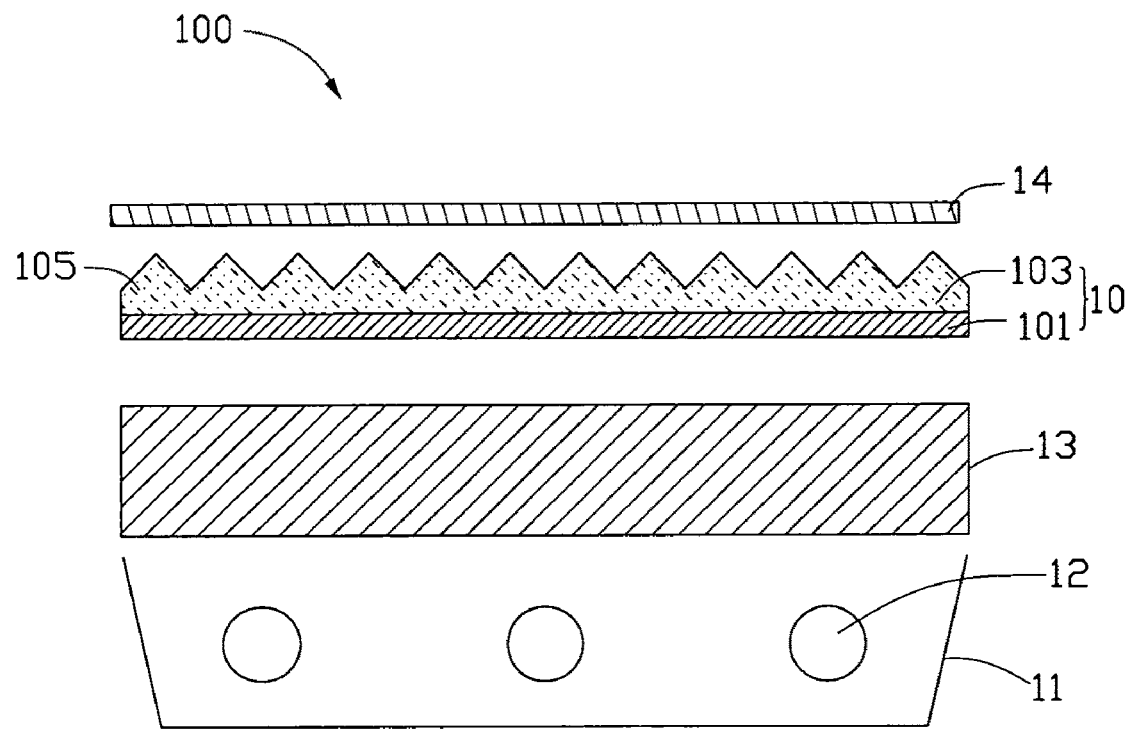
FIG. 10 is a cross-sectional view of a typical backlight module including a prism sheet.
Figure 11:
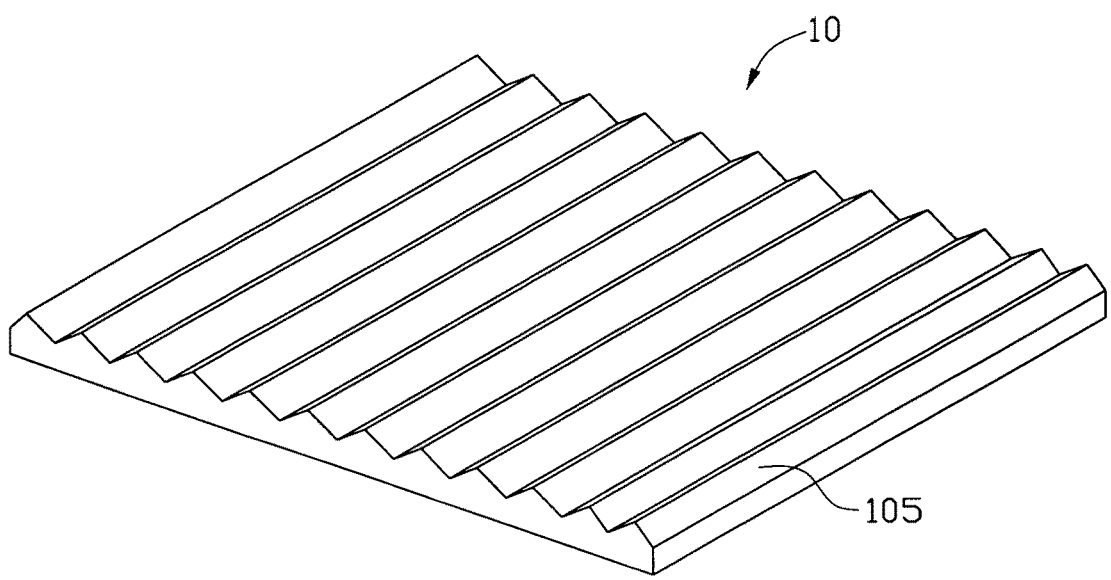
FIG. 11 is an isometric view of the prism sheet of the backlight module of FIG. 10.

Referring to FIG. 9, a fourth embodiment of an optical plate 50 is similar in principle to the third embodiment of the optical plate 40, except that the elongated arcuate troughs 512 in a first surface 510 of the optical plate 50 extend along a curved direction. When the optical plate 50 is employed in a display module, the matrix of the elongated arcuate troughs 512 is different from the pixel matrix of the panel, thereby preventing Morie Interference.

It is believed that the present embodiments and their advantages will be understood from the foregoing description, and it will be apparent that various changes may be made thereto without departing from the spirit and scope of the embodiments or sacrificing all of its material advantages, the examples hereinbefore described merely being preferred or exemplary embodiments.

What is claimed is:

1. An optical plate having a first surface defining a plurality of elongated arcuate troughs therein and a second surface opposite to the first surface, wherein the second surface defines a plurality of triangular pyramid depressions and a plurality of hexagonal pyramid depressions therein, each side of the triangular pyramid depressions borders with three hexagonal pyramid depressions, the elongated arcuate troughs extend along a curved direction.

2. The optical plate of claim 1, wherein sidewalls sharing a same edge on each side of the triangular pyramid depressions and adjacent hexagonal pyramid depressions collectively form a plurality of first trapeziform ridges extending along a first direction, a plurality of second trapeziform ridges extending along a second direction, and a plurality of third trapeziform ridges extending along a third direction; the first, second, and third trapeziform ridges intersect with one another; one of the first, second, and third direction is substantially perpendicular to an extending direction of the elongated arcuate troughs of the first surface.

3. The optical plate of claim 2, wherein an angle defined by the first direction and the second direction, an angle defined by the second direction and the third direction, and an angle defined by the first direction and the third direction are about 120 degrees.

4. The optical plate of claim 1, wherein sidewalls sharing a same edge on each side of the triangular pyramid depressions and adjacent hexagonal pyramid depressions collectively form a plurality of first V-shaped ridges extending along a first direction, a plurality of second V-shaped ridges extending along a second direction, and a plurality of third V-shaped ridges extending along a third direction; the first, second, and third V-shaped ridges intersect with one another; one of the first, second, and third direction is substantially perpendicular to an extending direction of the elongated arcuate troughs of the first surface.

5. The optical plate of claim 4, wherein an angle defined by the first direction and the second direction, an angle defined by the second direction and the third direction, and an angle defined by the first direction and the third direction are about 120 degrees.

6. The optical plate of claim 4, wherein the elongated arcuate troughs extend along a same linear direction or a curved direction.

7. The optical plate of claim 1, wherein a pitch between adjacent elongated arcuate troughs is about 0.025 millimeters to about 1.5 millimeters; a maximum depth of the elongated arcuate troughs is about 0.01 millimeters to about 3 millimeters.

8. The optical plate of claim 1, wherein a cross-section of the elongated arcuate troughs is a semi-circle or a semi-elliptical curve.

9. The optical plate of claim 1, wherein the optical plate is made of a material selected from polycarbonate, polymethyl methacrylate, polystyrene, copolymer of methyl methacrylate and styrene, and any combination thereof.

10. An optical plate comprising a plurality of diffusion particles dispersed in the optical plate, the optical plate having a first surface defining a plurality of elongated arcuate troughs therein, and a second surface opposite to the first surface, wherein the elongated arcuate troughs extend along a curved direction, the second surface defines a plurality of triangular pyramid depressions and a plurality of hexagonal pyramid depressions therein, each side of the triangular pyramid depressions borders three hexagonal pyramid depressions.

11. The optical plate of claim 10, wherein sidewalls sharing a same edge on each side of the triangular pyramid depressions and adjacent hexagonal pyramid depressions collectively form a plurality of first trapeziform ridges extending along a first direction, a plurality of second trapeziform ridges extending along a second direction, and a plurality of third trapeziform ridges extending along a third direction; the first, second, and third trapeziform ridges intersect with one another; one of the first, second, and third direction is substantially perpendicular to an extending direction of the elongated arcuate troughs of the first surface.

12. The optical plate of claim 11, wherein an angle defined by the first direction and the second direction, an angle defined by the second direction and the third direction, and an angle defined by the first direction and the third direction are about 120 degrees.

13. The optical plate of claim 10, wherein sidewalls sharing a same edge on each side of the triangular pyramid depressions and adjacent hexagonal pyramid depressions collectively form a plurality of first V-shaped ridges extending along a first direction, a plurality of second V-shaped ridges extending along a second direction, and a plurality of third V-shaped ridges extending along a third direction; the first, second, and third V-shaped ridges intersect with one another; one of the first, second, and third direction is substantially perpendicular to an extending direction of the elongated arcuate troughs of the first surface.

14. The optical plate of claim 13, wherein an angle defined by the first direction and the second direction, an angle defined by the second direction and the third direction, and an angle defined by the first direction and the third direction are about 120 degrees.

15. The optical plate of claim 10, wherein a pitch between adjacent elongated arcuate troughs is about 0.025 millimeters to about 1.5 millimeter; a maximum depth of the elongated arcuate troughs is about 0.01 millimeters to about 3 millimeters.

16. The optical plate of claim 10, wherein the optical plate is made of a material selected from polycarbonate, polymethyl methacrylate, polystyrene, copolymer of methyl methacrylate and styrene, and any combination thereof; the diffusion particles are made of material selected from titanium dioxide, silicon dioxide, acrylic resin, and any combination thereof.

17. A backlight module, comprising:
a housing;
a plurality of light sources arranged on a base of the housing; and
an optical plate positioned on the light sources at a top of the housing, the optical plate having:
a first surface defining a plurality of elongated arcuate troughs therein, and a second surface opposite to the first surface, wherein the second surface defines a plurality of triangular pyramid depressions and a plurality of hexagonal pyramid depressions therein, each side of the triangular pyramid depressions borders three hexagonal pyramid depressions, the elongated arcuate troughs extend along a curved direction.

18. The backlight module of claim 17, wherein the optical plate comprises a plurality of diffusion particles dispersed in the optical plate.

19. The backlight module of claim 17, wherein the light sources are linear light sources;
an extending direction of the light sources is parallel to an extending direction of the elongated arcuate troughs.

20. The optical plate of claim 10, wherein the elongated arcuate troughs extend across the first surface along parallel predetermined arcs, the predetermined arcs are arranged in the second surface side by side and are coplanar with the second surface.

* * * * *